US012307982B2

(12) United States Patent
Song et al.

(10) Patent No.: US 12,307,982 B2
(45) Date of Patent: May 20, 2025

(54) METHOD AND DEVICE FOR DRIVING A DISPLAY PANEL AND DISPLAY DEVICE

(71) Applicants: HEFEI VISIONOX TECHNOLOGY CO., LTD., Anhui (CN); KUNSHAN GO-VISIONOX OPTO-ELECTRONICS CO., LTD., Jiangsu (CN)

(72) Inventors: Chuansheng Song, Hefei (CN); Weiwei Pan, Hefei (CN); Wenxing Li, Hefei (CN); Yonggang Li, Hefei (CN); Mingwei Ge, Hefei (CN); Xiujian Zhu, Hefei (CN)

(73) Assignees: HEFEI VISIONOX TECHNOLOGY CO., LTD., Hefei (CN); KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 0 days.

(21) Appl. No.: 18/610,538

(22) Filed: Mar. 20, 2024

(65) Prior Publication Data

US 2024/0221688 A1 Jul. 4, 2024

Related U.S. Application Data

(63) Continuation-in-part of application No. PCT/CN2022/130608, filed on Nov. 8, 2022.

(30) Foreign Application Priority Data

Jun. 23, 2022 (CN) ......................... 202210719831.9

(51) Int. Cl.
*G09G 3/3291* (2016.01)

(52) U.S. Cl.
CPC ..... *G09G 3/3291* (2013.01); *G09G 2310/027* (2013.01); *G09G 2320/0247* (2013.01); *G09G 2330/021* (2013.01)

(58) Field of Classification Search
CPC ....... G09G 2330/021; G09G 2330/028; G09G 2320/0247; G09G 2320/043;
(Continued)

(56) References Cited

U.S. PATENT DOCUMENTS

2020/0111418 A1 4/2020 Nam et al.
2020/0160788 A1 5/2020 Son
(Continued)

FOREIGN PATENT DOCUMENTS

CN 108346399 A 7/2018
CN 111009218 A 4/2020
(Continued)

OTHER PUBLICATIONS

International Search Report issued on Feb. 28, 2023, in corresponding International Application No. PCT/CN2022/130608, 6 pages.
(Continued)

*Primary Examiner* — Dong Hui Liang
(74) *Attorney, Agent, or Firm* — Maier & Maier, PLLC

(57) ABSTRACT

A method and device for driving a display panel and a display device. The method for driving a display panel includes: determining a brightness mode of the display panel, where the same display grayscale corresponds to different data voltages in different brightness modes; determining a data voltage characterization value according to the brightness mode, where the data voltage characterization value is used for characterizing a data voltage level in the brightness mode; determining a holding voltage corresponding to the data voltage characterization value according to the data voltage characterization value; and inputting, in a
(Continued)

display holding frame of a current display image, the holding voltage to a source electrode of a drive transistor in each sub-pixel of the display panel.

16 Claims, 5 Drawing Sheets

(58) Field of Classification Search

CPC ......... G09G 2320/0233; G09G 3/3233; G09G 3/3291; G09G 3/3266; G09G 3/20; G09G 3/3258; G09G 3/2096; G09G 3/3225; G09G 3/32; G09G 3/3648; G09G 3/3614; G09G 3/3659; G09G 2300/0819; G09G 2300/0842; G09G 2300/0861; G09G 2300/0426; G09G 2300/0852; G09G 2300/0809; G09G 2310/08; G09G 2310/0251; G09G 2310/0297; G09G 2340/0435

See application file for complete search history.

(56) References Cited

U.S. PATENT DOCUMENTS

| | | | | |
|---|---|---|---|---|
| 2020/0243008 | A1 | 7/2020 | Lee et al. | |
| 2020/0349879 | A1 * | 11/2020 | Park | G09G 3/3233 |
| 2021/0174743 | A1 * | 6/2021 | Chang | G09G 3/3291 |
| 2022/0068202 | A1 | 3/2022 | Kim et al. | |
| 2023/0079102 | A1 * | 3/2023 | Kim | H01L 29/0847 345/204 |
| 2023/0143180 | A1 * | 5/2023 | Song | G09G 3/3233 345/691 |
| 2024/0212606 | A1 * | 6/2024 | Wu | G09G 3/3233 |

FOREIGN PATENT DOCUMENTS

| | | | |
|---|---|---|---|
| CN | 111341269 | A | 6/2020 |
| CN | 111445863 | A | 7/2020 |
| CN | 111710299 | A | 9/2020 |
| CN | 111710300 | A | 9/2020 |
| CN | 112509519 | A | 3/2021 |
| CN | 112634832 | A | 4/2021 |
| CN | 112771602 | A | 5/2021 |
| CN | 113012643 | A | 6/2021 |
| CN | 113793569 | A | 12/2021 |
| CN | 113990244 | A | 1/2022 |
| CN | 114038429 | A | 2/2022 |
| CN | 114420032 | A | 4/2022 |
| CN | 114420034 | A | 4/2022 |
| CN | 114863878 | A | 8/2022 |
| CN | 115064118 | A | 9/2022 |
| KR | 20160007862 | A | 1/2016 |
| KR | 1020210083644 | A | 7/2021 |

OTHER PUBLICATIONS

Office Action issued on Sep. 24, 2024, in corresponding Korean Application No. 10-2024-7004333, 8 pages.

* cited by examiner

METHOD AND DEVICE FOR DRIVING A DISPLAY PANEL AND DISPLAY DEVICE

CROSS-REFERENCE TO RELATED APPLICATIONS

This application is a continuation-in-part of International Patent Application No. PCT/CN2022/130608, filed on Nov. 8, 2022, which claims priority to Chinese Patent Application No. 202210719831.9 filed on Jun. 23, 2022, the disclosures of which are incorporated herein by reference in their entireties.

TECHNICAL FIELD

The present application relates to display technology, for example, a method and device for driving a display panel and a display device.

BACKGROUND

Organic light-emitting diode (OLED) panels have the advantages of self-luminescence, a low drive voltage, high luminescence efficiency, a fast response speed, lightness and thinness and a high contrast and are more and more widely applied to devices with a display function, such as a mobile phone and a computer.

The current OLED display products have poor display effect.

SUMMARY

The present application provides a method and device for driving a display panel and a display device.

In a first aspect, embodiments of the present application provide a method for driving a display panel. The method includes the steps below.

A brightness mode of the display panel is determined, where data voltages corresponding to a same display grayscale in different brightness modes are different.

A data voltage characterization value is determined according to the brightness mode, where the data voltage characterization value is used for characterizing a data voltage level of the brightness mode.

A holding voltage corresponding to the data voltage characterization value is determined according to the data voltage characterization value.

The holding voltage is input, in a display holding frame of a current display image, to a source electrode of a drive transistor in each sub-pixel of the display panel.

In a second aspect, embodiments of the present application further provide a device for driving a display panel. The device includes a brightness mode determination module, a characterization value determination module, a holding voltage determination module and a drive module.

The brightness mode determination module is configured to determine a brightness mode of the display panel.

The characterization value determination module is configured to determine a data voltage characterization value according to the brightness mode, where data voltages corresponding to a same display grayscale in different brightness modes are different, and the data voltage characterization value is used for characterizing a data voltage level of the brightness mode.

The holding voltage determination module is configured to determine a holding voltage corresponding to the data voltage characterization value according to the data voltage characterization value.

The drive module is configured to input, in a display holding frame of a current display image, the holding voltage to a source electrode a drive transistor in each sub-pixel of the display panel.

In a third aspect, embodiments of the present application further provide a display device, including a display panel and the device for driving a display panel according to any embodiment of the present application.

DETAILED DESCRIPTION

Hereinafter the present application is described in detail in conjunction with the drawings and embodiments.

A low temperature polycrystalline oxide (LTPO)-type OLED display panel can stabilize a data voltage in multiple frames due to the characteristic of high impedance of a drive transistor and thus is applied to a scenario of a relatively small refresh rate, thereby reducing the power consumption of a display device. When LTPO is applied to such scenario, the solution of dynamic frame skipping is generally used. Based on the original timing at a high refresh rate, one frame is retained for writing display data, which is referred to as a data write frame, and in other frames, data lines output a fixed voltage and no data is written to a gate electrode of the drive transistor so that display image data are not refreshed (where the other frames are referred to as display holding frames). A data voltage output from the data lines in the data write frame is related to a current display image and varies with the image. In the display holding frames, the data lines output a fixed holding voltage, and a difference between the data voltage and the holding voltage affects a difference between currents flowing through an organic light-emitting diode in a pixel circuit, which results in inconsistency of the brightness in the data write frame and the brightness in the holding frame while displaying an image. Thus, a flicker occurs.

Figure 1:
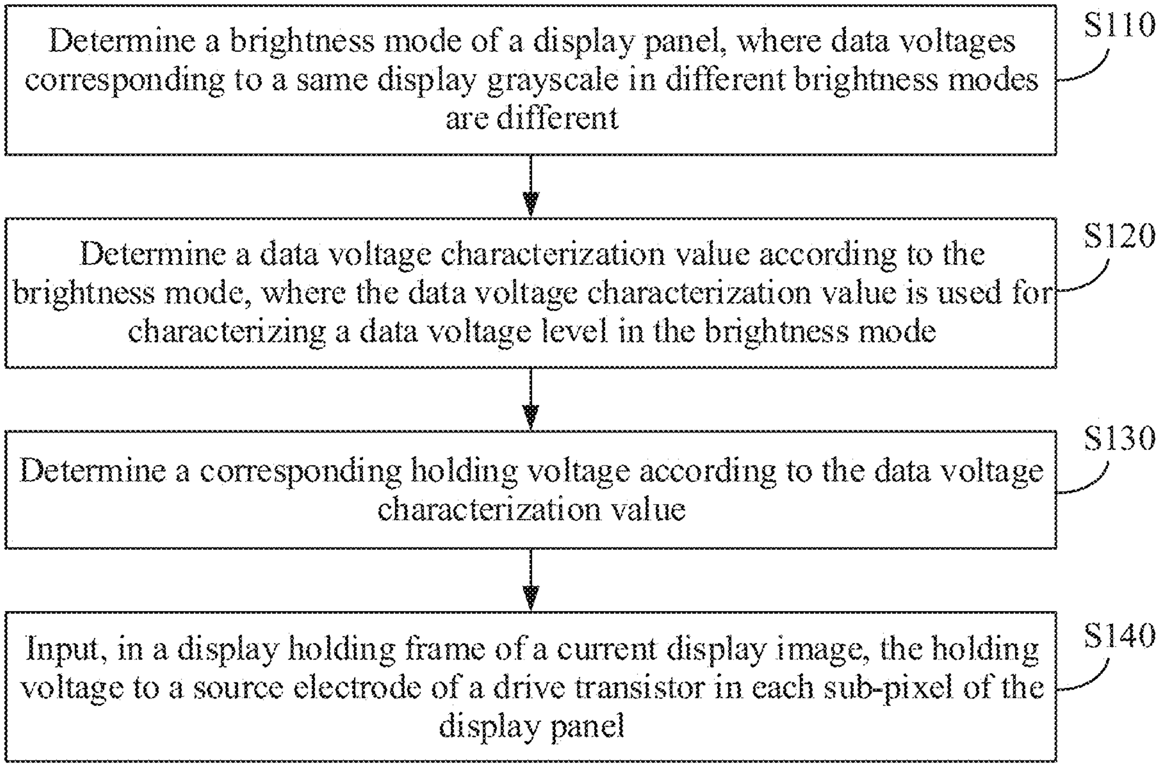
FIG. 1 is a flowchart of a method for driving a display panel according to embodiments of the present application.

Embodiments of the present application provide a method for driving a display panel. FIG. 1 is a flowchart of a method for driving a display panel according to embodiments of the present application. Referring to FIG. 1, the method includes S110 to S140.

In S110, a brightness mode of the display panel is determined, where data voltages corresponding to a same display grayscale in different brightness modes are different.

The display panel may include multiple brightness modes, and data voltages for displaying the same display grayscale in different brightness modes are different. Different brightness modes correspond to different display brightness ranges, where the different brightness modes correspond to the same lowest display brightness of 0 nits, and the different brightness modes correspond to different maximum display brightness. For example, the maximum display brightness may be 2 nits, 10 nits, 50 nits, 100 nits or 500 nits. The different brightness modes have the same grayscale range which may be, for example, 0-255 grayscales. Therefore, the same display grayscale in the different brightness modes corresponds to different brightness and different data voltages.

In S120, a data voltage characterization value is determined according to the brightness mode, where the data voltage characterization value is used for characterizing a data voltage level of the brightness mode.

For example, a data voltage characterization value may be set for each brightness mode, and different brightness modes correspond to different data voltage characterization values. In this embodiment, different data voltage characterization values are set for different brightness modes so that the data voltage characterization values can better reflect data voltage levels in the different brightness modes.

In S130, a corresponding holding voltage is determined according to the data voltage characterization value.

For example, different data voltage characterization values correspond to different holding voltages, and the holding voltages corresponding to the different data voltage characterization values may be determined according to an experiment. The data voltage characterization values and the holding voltages are stored in a database or a storage table. After the data voltage characterization value is determined, the corresponding holding voltage is directly called from the database or the storage table. For example, holding voltages corresponding to several data voltage characterization values may be stored in the storage table. When a data voltage characterization value of a certain holding voltage is not stored in the table, the corresponding holding voltage may be determined according to an interpolation algorithm, such as linear interpolation or non-linear interpolation.

In S140, the holding voltage is input, in a display holding frame of a current display image, to a source electrode a drive transistor in each sub-pixel of the display panel.

For example, each drive cycle of the display panel includes a data write frame and the display holding frame, and the data write frame includes a data write stage and a light emission stage, where a data voltage is written to a gate electrode of the drive transistor through a data line at the data write stage and drives an organic light-emitting diode to emit light at the light emission stage. The display holding frame also includes a data write stage and a light emission stage. At the data write stage of the display holding frame, no data voltage is written to the gate electrode of the drive transistor but the holding voltage is written to the source electrode the drive transistor through the data line so as to drive the organic light-emitting diode to emit light at the light emission stage.

In this embodiment, the holding voltage is input, in the display holding frame, to the source electrode the drive transistor in the sub-pixel, the holding voltage in this embodiment is determined according to the data voltage characterization value, the data voltage characterization value is determined according to the brightness mode of the display panel, and the holding voltage varies with the brightness mode so that when the display panel performs display in different brightness modes, a difference between the holding voltage in the holding frame and the data voltage does not vary greatly, thereby avoiding a relatively large variation of the difference between the holding voltage and the data voltage which affects currents flowing through the organic light-emitting diode. In this manner, when the display panel displays the same image, the brightness of the data write frame and the brightness of the holding frame tend to be consistent, thereby avoiding a flicker and improving the display effect of the display panel performing display at a relatively small rate.

Optionally, the brightness mode of the display panel is determined in the manner below.

The brightness mode of the display panel is determined according to a position of a brightness bar of the display panel, where the different brightness modes correspond to different positions of the brightness bar.

For example, the display panel is generally provided with a brightness bar, and the position of the brightness bar is adjusted so that the brightness mode can be changed. For example, in an environment with relatively low environmental brightness such as an indoor environment, the position of the brightness bar may be adjusted so that the display panel displays an image in a brightness mode with relatively low maximum brightness, and in an environment with relatively high environmental brightness such as an outdoor environment, the position of the brightness bar may be adjusted so that the display panel displays an image in a brightness mode with relatively high maximum brightness.

Figure 2:
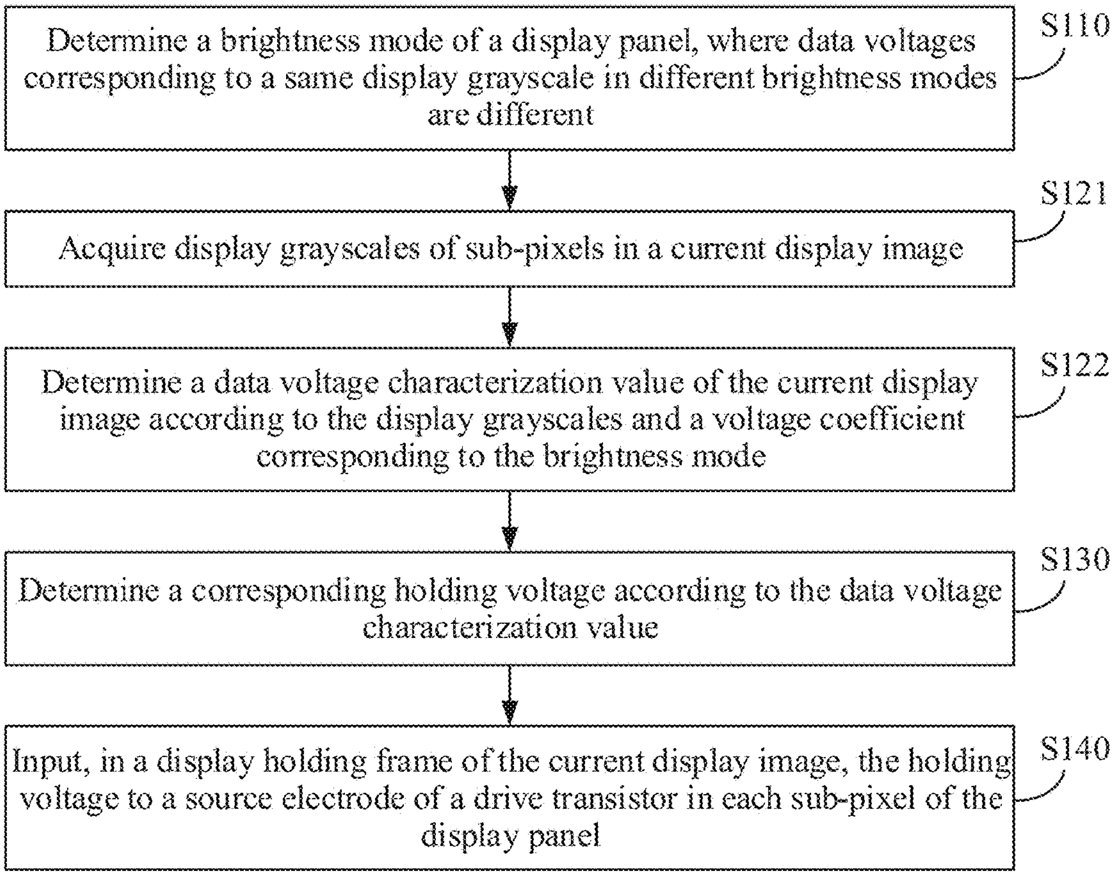
FIG. 2 is a flowchart of another method for driving a display panel according to embodiments of the present application.

Based on the preceding embodiments, this embodiment further provides a method for driving a display panel. FIG. 2 is a flowchart of another method for driving a display panel according to embodiments of the present application. Referring to FIG. 2, the method includes S110 to S140.

In S110, a brightness mode of the display panel is determined, where data voltages corresponding to a same display grayscale in different brightness modes are different.

In S121, display grayscales of multiple sub-pixels in a current display image are acquired.

The current display image is an image currently displayed by the display panel.

In S122, a data voltage characterization value of the current display image is determined according to the display grayscales of the multiple sub-pixels and a voltage coefficient corresponding to the brightness mode.

For example, each brightness mode corresponds to a voltage coefficient, different brightness modes correspond to different voltage coefficients, and the voltage coefficient corresponding to the brightness mode is used for representing a correspondence between display grayscales and data voltages in the brightness mode.

Optionally, the step in which the data voltage characterization value of the current display image is determined according to the display grayscales of the multiple sub-pixels and the voltage coefficient corresponding to the brightness mode includes that: the data voltage characterization value of the current display image is determined according to a product of a display grayscale of the display grayscales of the multiple sub-pixels and the voltage coefficient corresponding to the brightness mode. For example, a voltage coefficient corresponding to a first brightness mode is p, and a data voltage characterization value corresponding to a display grayscale m is $m \times p$; a voltage coefficient corresponding to a second brightness mode is q, and a data voltage characterization value corresponding to the display grayscale m is $m \times q$.

Additionally, voltage coefficients corresponding to different brightness modes may have a certain relationship. For example, a first voltage coefficient when a brightness bar is at a first position is DBV[1]_Gain, and a second voltage coefficient when the brightness bar is at a second position is DBV[n]_Gain. Assuming that the brightness of a display grayscale 255 when the brightness bar is at the first position is Lv[1]_255 and the brightness of the display grayscale 255 when the brightness bar is at the second position is Lv[n]_255, the brightness of a display grayscale k (for example, gamma is 2.2) when the brightness bar is at the second position is Lv[n]_k=Lv[n]_255×(k/255)^2.2.

Assuming that when the brightness bar is at the first position, a display grayscale j has brightness the same as the brightness Lv[n]_k, the brightness of the display grayscale j is Lv[1]_j=Lv[1]_255×(j/255)^2.2. Since Lv[1]_j=Lv[n]_k, Lv[n]_255×(k/255)^2.2=Lv[1]_255×(j/255)^2.2, and j=k×(Lv[n]_255/Lv[1]_255)^(1/2.2).

Since data voltages at the same brightness are the same, j×DBV[1]_Gain=k×DBV[n]_Gain.

It is obtained according to the above formulas that DBV[1]_Gain/DBV[n]_Gain=(Lv[1]_255/Lv[n]_255)^(1/2.2).

Additionally, the entire display panel may use one data voltage characterization value, where the data voltage characterization value may be determined according to an average of the display grayscales of all the sub-pixels of the display panel and the voltage coefficient corresponding to the display mode, or the data voltage characterization value may be determined according to an average of maximum display grayscale of at least one sub-pixel in each of the pixel units of the display panel and the voltage coefficient corresponding to the display mode. The data voltage characterization value may be determined according to a data voltage of the sub-pixel. For example, the data voltage characterization value may be determined according to the data voltage of each sub-pixel and the voltage coefficient corresponding to the display mode.

Alternatively, the display panel may be divided into multiple regions, and each region uses one data voltage characterization value. The data voltage characterization value of each region is determined according to a data voltage characterization value of each sub-pixel in the region, and the data voltage characterization value of each sub-pixel is determined according to a display grayscale of the sub-pixel and the voltage coefficient corresponding to the display mode. Alternatively, the data voltage characterization value of each region may be determined according to an average of maximum display grayscale of at least one sub-pixel in each of the pixel units in the region and the voltage coefficient corresponding to the display mode.

In S130, a corresponding holding voltage is determined according to the data voltage characterization value.

In S140, the holding voltage is input, in a display holding frame of the current display image, to a source electrode a drive transistor in each sub-pixel of the display panel.

In this embodiment, in the display holding frame, a data line is controlled to input the holding voltage to the source electrode the drive transistor of the sub-pixel, the holding voltage in this embodiment is determined according to the data voltage characterization value, the data voltage characterization value is determined according to the display grayscales of the multiple sub-pixels in the current display image and the voltage coefficient corresponding to the display mode, and the holding voltage varies according to different data voltage characterization values, that is, the holding voltage varies with the display image so that when the display panel displays different display images, a difference between the holding voltage in the holding frame and a data voltage does not vary greatly, thereby avoiding a relatively large variation of the difference between the holding voltage and the data voltage of a different display image which affects currents flowing through an organic light-emitting diode. In this manner, when the display panel displays the same image, the brightness of a data write frame and the brightness of the holding frame tend to be consistent, thereby improving the display effect of the display panel.

Figure 3:
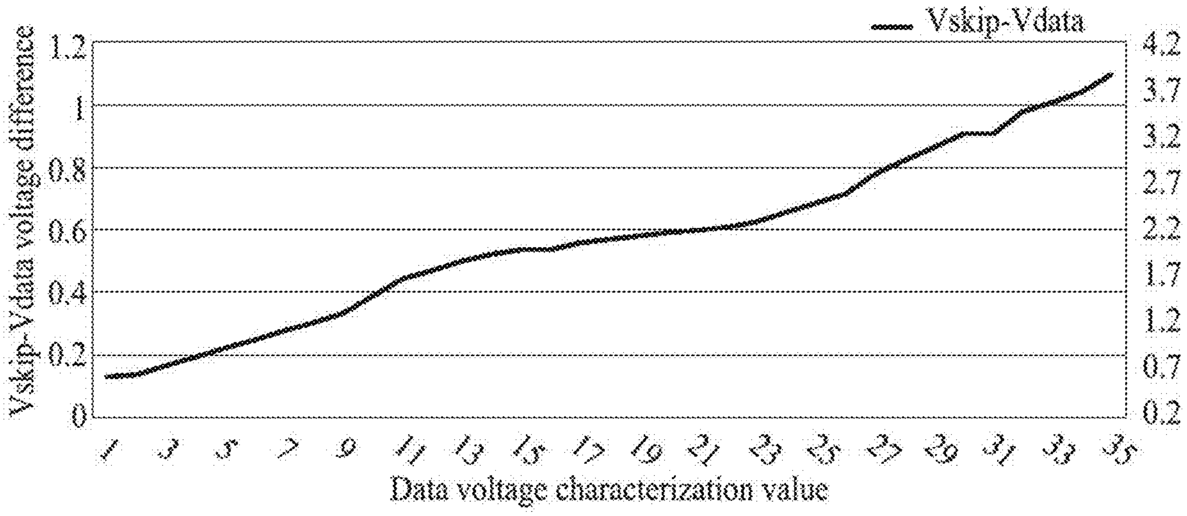
FIG. 3 shows a correspondence between holding voltages and data voltage characterization values according to embodiments of the present application.
Figure 4:
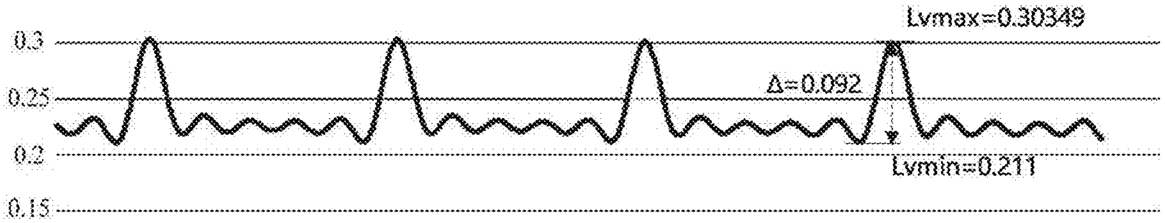
FIG. 4 is a schematic diagram of display brightness of a display panel in the related art.
Figure 5:
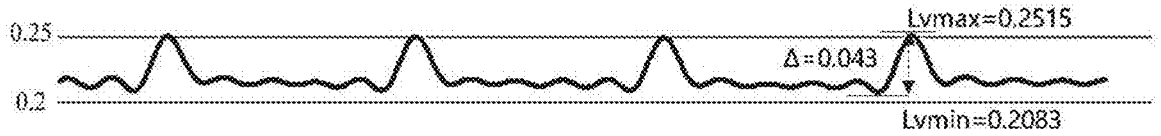
FIG. 5 is a schematic diagram of display brightness of a display panel according to embodiments of the present application.

FIG. 3 shows a correspondence between holding voltages and data voltage characterization values according to embodiments of the present application. Referring to FIG. 3, the horizontal axis represents different data voltage characterization values, and the vertical axis represents a difference between the holding voltage Vskip and the data voltage characterization value Vdata. FIG. 4 is a schematic diagram of display brightness of a display panel in the related art. FIG. 5 is a schematic diagram of display brightness of a display panel according to embodiments of the present application. Referring to FIGS. 4 and 5, when the display panel in the related art and the display panel in this embodiment display the same image, a difference between maximum display brightness Lvmax and minimum display brightness Lvmin of the display panel in this embodiment is smaller, and when the display panel in this embodiment displays the same image, the brightness of the data write frame and the brightness of the holding frame tend to be consistent, and the display effect is better.

Optionally, before the holding voltage is input, in the display holding frame of the current display image, to the source electrode the drive transistor in each sub-pixel of the display panel, the method further includes the step below.

A data voltage corresponding to each sub-pixel is written, in a data write frame of the current display image, to a gate electrode of the drive transistor in the each sub-pixel.

An initialization stage may be included before a write stage of the data write frame and a write stage of the display holding frame, where the initialization stage of the data write frame is used for initializing the gate electrode of the drive transistor and an anode of the organic light-emitting diode, and the initialization stage of the display holding frame is used for initializing the anode of the organic light-emitting diode.

Figure 6:
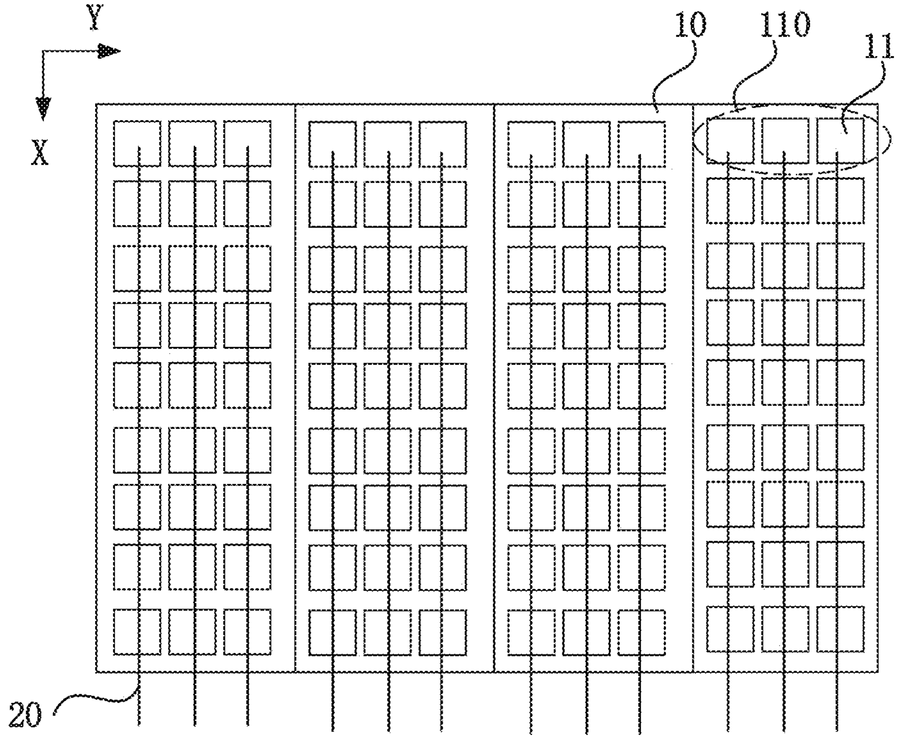
FIG. 6 is a schematic diagram of a display panel according to embodiments of the present application.

FIG. 6 is a schematic diagram of a display panel according to embodiments of the present application. Optionally, referring to FIG. 6, the display panel includes multiple display sub-regions 10, at least one pixel unit 110 is provided in each display sub-region 10, and each pixel unit 110 includes at least one sub-pixel 11.

The step in which the data voltage characterization value of the current display image is determined according to the display grayscales and the voltage coefficient corresponding to the brightness mode includes the steps below.

A maximum display grayscale of the at least one sub-pixel in each pixel unit in each display sub-region of the display panel is determined so that at least one maximum display grayscale of the at least one pixel unit in each display sub-region is obtained.

An average of the at least one maximum display grayscale of the at least one pixel unit in each display sub-region is calculated so that a first grayscale average of the each display sub-region is obtained.

A data voltage characterization value of each display sub-region is determined according to the first grayscale average of the each display sub-region and the voltage coefficient corresponding to the brightness mode.

Accordingly, the step in which the corresponding holding voltage is determined according to the data voltage characterization value includes the step below.

A holding voltage of each display sub-region is determined according to the data voltage characterization value of the each display sub-region.

Each display sub-region 10 may include multiple pixel units 110, and each pixel unit 110 may include at least three sub-pixels 11 emitting different colors, for example, each pixel unit 110 includes a red sub-pixel, a green sub-pixel and a blue sub-pixel.

For example, the maximum display grayscale of display grayscales of all the sub-pixels 11 in each pixel unit 110 is determined, that is, the maximum display grayscale of all the sub-pixels 11 in each pixel unit 110 is determined. For example, in a pixel unit 110, the red sub-pixel has a display grayscale of 100, the green sub-pixel has a display grayscale of 103, and the blue sub-pixel has a display grayscale of 109. Then, the maximum display grayscale of the pixel unit 110 is 109. An average of maximum display grayscales of all the pixel units in each display sub-region 10 is calculated so that the first grayscale average of the display sub-region is obtained, the first grayscale average of each display sub-region 10 is multiplied by the voltage coefficient corresponding to the brightness mode so that the data voltage characterization value of each display sub-region 10 is obtained, and the corresponding holding voltage is determined according to the data voltage characterization value. Finally, the holding voltage is input, in the display holding frame, to the source electrode the drive transistor in the sub-pixel 11 in the corresponding display sub-region 10 through a data line 20.

In this embodiment, the display panel is divided into regions, the first grayscale average is calculated according to the maximum display grayscale of each pixel unit in each display sub-region, the data voltage characterization value is determined, and the holding voltage is determined so that the holding voltage of each display sub-region is more in accordance with an actual display image of the display sub-region, and the holding voltage better matches a data voltage of the display sub-region, thereby avoiding a relatively large variation of the difference between the holding voltage and the data voltage of a different display image which affects the currents flowing through the organic light-emitting diode. In this manner, when the display panel displays the same image, the brightness of the data write frame and the brightness of the holding frame tend to be consistent, improving the display effect of the display panel.

Optionally, with continued reference to FIG. 6, the display panel includes multiple data lines 20 configured to input the holding voltage.

Adjacent sub-pixels 11 along a first direction X are electrically connected to the same data line 20, and the multiple display sub-regions 10 are arranged along a second direction Y, where the first direction X intersects the second direction Y.

In this manner, sub-pixels 11 arranged in sequence along the first direction X in each display sub-region 10 use the same data line. Since each display sub-region 10 uses the same holding voltage, the same data line 20 only needs to output one holding voltage in the display holding frame without changing the outputted voltage frequently, thereby reducing the power consumption of an integrated circuit (IC).

Optionally, the display panel includes multiple pixel units 110, and each pixel unit 110 includes at least one sub-pixel 11. The step in which the data voltage characterization value of the current display image is determined according to the display grayscales and the voltage coefficient corresponding to the brightness mode includes the steps below.

A maximum display grayscale of the at least one sub-pixel in each pixel unit is determined so that multiple maximum display grayscales of the multiple pixel unit are obtained.

An average of the multiple maximum display grayscales of the multiple pixel units of the display panel is calculated so that a second grayscale average is obtained.

The data voltage characterization value of the display panel is determined according to the second grayscale average and the voltage coefficient corresponding to the brightness mode.

In this embodiment, the second grayscale average is calculated according to the average of the maximum display grayscales of all the pixel units of the display panel, the data voltage characterization value is determined according to the second grayscale average and the voltage coefficient, and the holding voltage is determined. All the sub-pixels of the display panel use the same holding voltage, and all the data lines only need to output the same holding voltage in the holding frame of a display image, thereby ensuring low power consumption and reducing an amount of computation.

Optionally, each drive cycle includes one data write frame and N display holding frames, and each of the N display holding frames has the same duration as the one data write frame, where N is greater than or equal to 2. The value of N may be determined according to a display frequency. For example, in a high-frequency display mode of the display panel, the duration of one frame is 8.3 ms, that is, the duration of the data write frame or the display holding frame is 8.3 ms. If the display at a relatively small frequency of 10 Hz needs to be implemented in the high-frequency display mode, 12 high-frequency frames are required, one data write frame and 11 display holding frames are required, and the value of N is 11.

Optionally, the brightness mode of the display panel is determined in the manner below.

The brightness mode of the display panel is determined according to a position of a brightness bar of the display panel, where the different brightness modes correspond to different positions of the brightness bar.

For example, the display panel is generally provided with the brightness bar, and the position of the brightness bar is adjusted so that the brightness mode can be changed. For example, in an environment with relatively low environmental brightness such as an indoor environment, the position of the brightness bar may be adjusted so that the display panel displays an image in a brightness mode with relatively low maximum brightness, and in an environment with relatively high environmental brightness such as an outdoor environment, the position of the brightness bar may be adjusted so that the display panel displays an image in a brightness mode with relatively high maximum brightness. The position of the brightness bar of the display panel may be acquired so that the brightness mode of the display panel is determined.

Figure 7:
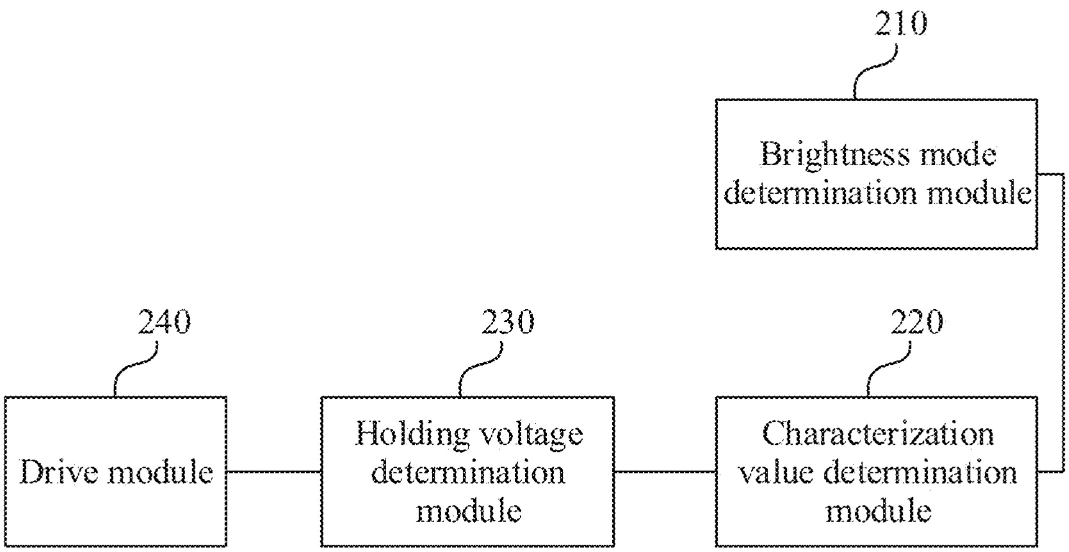
FIG. 7 is a schematic diagram of a device for driving a display panel according to embodiments of the present application.

Embodiments of the present application further provide a device for driving a display panel. FIG. 7 is a schematic diagram of a device for driving a display panel according to embodiments of the present application. Referring to FIG. 7, the device includes a brightness mode determination module 210, a characterization value determination module 220, a holding voltage determination module 230 and a drive module 240.

The brightness mode determination module 210 is configured to determine a brightness mode of the display panel, where data voltages corresponding to a same display grayscale in different brightness modes are different.

The characterization value determination module 220 is configured to determine a data voltage characterization value according to the brightness mode, where the data voltage characterization value is used for characterizing a data voltage level of the brightness mode.

The holding voltage determination module 230 is configured to determine a holding voltage corresponding to the data voltage characterization value according to the data voltage characterization value.

The drive module 240 is configured to input, in a display holding frame of a current display image, the holding voltage to a source electrode a drive transistor in each sub-pixel of the display panel.

Optionally, the characterization value determination module 220 includes a display grayscale acquisition submodule and a characterization value determination submodule.

The display grayscale acquisition submodule is configured to acquire display grayscales of multiple sub-pixels in the current display image.

The characterization value determination submodule is configured to determine the data voltage characterization value of the current display image according to the display grayscales of the multiple sub-pixels and a voltage coefficient corresponding to the brightness mode.

Optionally, the display panel includes multiple display sub-regions, at least one pixel unit is provided in each display sub-region, and each pixel unit includes at least one sub-pixel; and the characterization value determination submodule includes a first grayscale determination unit, a first average calculation unit and a first characterization value determination unit.

The first grayscale determination unit is configured to determine a maximum display grayscale of the at least one sub-pixel in each pixel unit in each display sub-region of the display panel to obtain at least one maximum display grayscale of the at least one pixel unit in each display sub-region.

The first average calculation unit is configured to calculate an average of the at least one maximum display grayscale of the at least one pixel unit in each display sub-region to obtain a first grayscale average of the each display sub-region.

The first characterization value determination unit is configured to determine a data voltage characterization value of each display sub-region according to the first grayscale average of the each display sub-region and the voltage coefficient corresponding to the brightness mode.

Accordingly, the holding voltage determination module 230 is configured to determine a holding voltage of each display sub-region according to the data voltage characterization value of the each display sub-region.

Optionally, the display panel includes multiple data lines configured to input the holding voltage.

Adjacent sub-pixels along a first direction are electrically connected to the same data line, and the multiple display sub-regions are arranged along a second direction, where the first direction intersects the second direction.

Optionally, the display panel includes multiple pixel units, and each pixel unit includes at least one sub-pixel; and the characterization value determination submodule includes a second grayscale determination unit, a second average calculation unit and a second characterization value determination unit.

The second grayscale determination unit is configured to determine a maximum display grayscale of the at least one sub-pixel in each pixel unit to obtain multiple maximum display grayscales of the multiple pixel units.

The second average calculation unit is configured to calculate an average of the multiple maximum display grayscales of the multiple pixel units of the display panel to obtain a second grayscale average.

The second characterization value determination unit is configured to determine the data voltage characterization value of the display panel according to the second grayscale average and the voltage coefficient corresponding to the brightness mode.

Optionally, the brightness mode determination module is configured to determine the brightness mode of the display panel according to a position of a brightness bar of the display panel, where the different brightness modes correspond to different positions of the brightness bar.

Optionally, the characterization value determination submodule is configured to determine the data voltage characterization value of the current display image according to a product of a display grayscale of the display grayscales of the multiple sub-pixels and the voltage coefficient corresponding to the brightness mode.

Optionally, the device further includes a data write module.

The data write module is configured to, before the holding voltage is input, in the display holding frame of the current display image, to the source electrode the drive transistor in each sub-pixel of the display panel, write, in a data write frame of the current display image, a data voltage corresponding to each sub-pixel to a gate electrode of the drive transistor in the each sub-pixel.

Optionally, each drive cycle includes one data write frame and N display holding frames, and each of the N display holding frames has the same duration as the one data write frame, where N is greater than or equal to 2.

The device for driving a display panel according to this embodiment and the method for driving a display panel according to any embodiment of the present application belong to the same inventive concept. For technical details not described in detail in this embodiment, reference may be made to the method for driving a display panel according to any embodiment of the present application.

Figure 8:
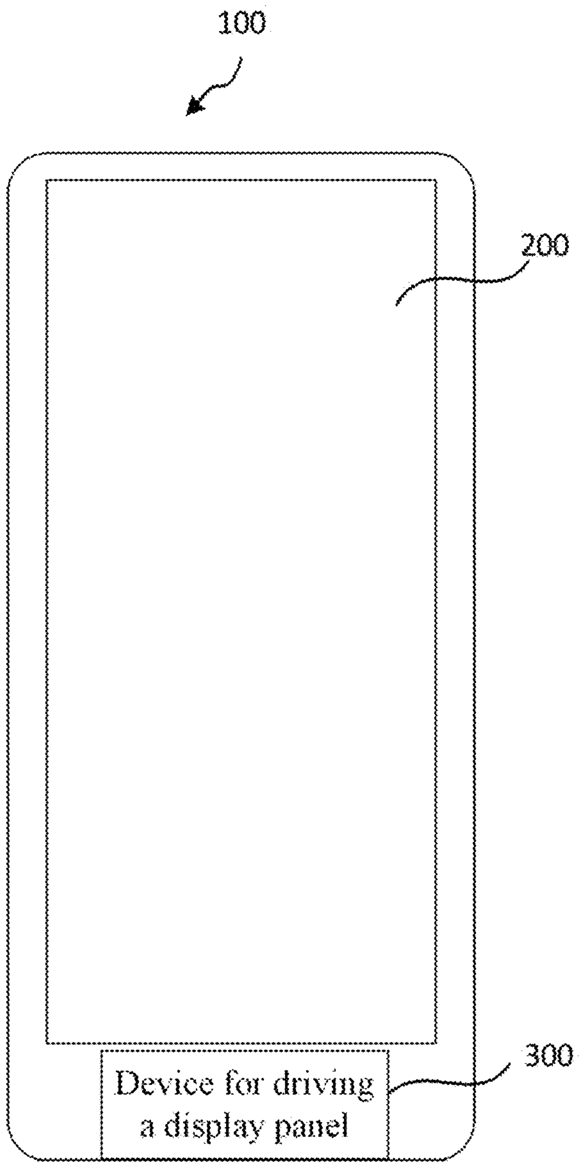
FIG. 8 is a schematic diagram of a display device according to embodiments of the present application.

Embodiments of the present application further provide a display device. FIG. 8 is a schematic diagram of a display device according to embodiments of the present application. Referring to FIG. 8, a display device 100 includes a display panel 200 and a device 300 for driving a display panel according to any embodiment of the present application. The display device 100 may be an electronic device such as a mobile phone and a tablet computer. In some embodiments of the present application, the device 300 is electronically connected to the display panel 200 and is configured to drive the display panel 200. In some embodiments of the present application, the device 300 for driving a display panel includes a processor and a memory. The memory is communicatively connected to the at least one processor. The memory stores a computer program that can be executed by the at least one processor, and the computer program is executed by the at least one processor, to enable the at least one processor to execute the method described above.

All or part of the steps of the method, and functional modules/units in the system and apparatus disclosed above are implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application-specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital video disc (DVD) or other optical disc storage, a magnetic cassette, a magnetic tape, disk storage or other magnetic storage apparatus, or any other medium used to store the desired information and accessible by a computer. In addition, as is known to those skilled in the art, the communication media generally include computer-readable instructions, data structures, program modules or other data in modulated data signals such as carriers or other transmission mechanisms, and may include any information delivery media.

What is claimed is:

1. A method for driving a display panel, comprising:

determining a brightness mode of the display panel, wherein a same display grayscale in different brightness modes corresponds to different data voltages;

determining a data voltage characterization value according to the brightness mode, wherein the data voltage characterization value is used for characterizing a data voltage level of the brightness mode;

determining a holding voltage corresponding to the data voltage characterization value according to the data voltage characterization value; and inputting, in a display holding frame of a current display image, the holding voltage to a source electrode of a drive transistor in each sub-pixel of the display panel.

2. The method of claim 1, wherein determining the data voltage characterization value according to the brightness mode comprises:

acquiring display grayscales of a plurality of sub-pixels in the current display image; and determining the data voltage characterization value of the current display image according to the display grayscales of the plurality of sub-pixels and a voltage coefficient corresponding to the brightness mode.

3. The method of claim 2, wherein the display panel comprises a plurality of display sub-regions, at least one pixel unit is provided in each of the plurality of display sub-regions, and each of the at least one pixel unit comprises at least one sub-pixel;

determining the data voltage characterization value of the current display image according to the display grayscales of the plurality of sub-pixels and the voltage coefficient corresponding to the brightness mode comprises:

determining a maximum display grayscale of the at least one sub-pixel in each of the at least one pixel unit in each of the plurality of display sub-regions of the display panel to obtain a maximum display grayscale of each of the at least one pixel unit in each of the plurality of display sub-regions;

calculating an average of maximum display grayscales of all pixel units in each of the plurality of display sub-regions to obtain a first grayscale average of the each of the plurality of display sub-regions; and determining a data voltage characterization value of each of the plurality of display sub-regions according to the first grayscale average of the each of the plurality of display sub-regions and the voltage coefficient corresponding to the brightness mode; and determining the holding voltage according to the data voltage characterization value comprises:

determining a holding voltage of each of the plurality of display sub-regions according to the data voltage characterization value of the each of the plurality of display sub-regions.

4. The method of claim 3, wherein the display panel comprises a plurality of data lines configured to input the holding voltage; and adjacent sub-pixels along a first direction are electrically connected to a same data line of the plurality of data lines, and the plurality of display sub-regions are arranged along a second direction, wherein the first direction intersects the second direction.

5. The method of claim 2, wherein the display panel comprises a plurality of pixel units, and each of the plurality of pixel units comprises at least one sub-pixel; and determining the data voltage characterization value of the current display image according to the display grayscales of the plurality of sub-pixels and the voltage coefficient corresponding to the brightness mode comprises:

determining a maximum display grayscale of the at least one sub-pixel in each of the plurality of pixel units to obtain a maximum display grayscale of each of the plurality of pixel units;

calculating an average of maximum display grayscales of the plurality of pixel units of the display panel to obtain a second grayscale average; and determining the data voltage characterization value of the display panel according to the second grayscale average and the voltage coefficient corresponding to the brightness mode.

6. The method of claim 2, wherein determining the data voltage characterization value of the current display image according to the display grayscales of the plurality of sub-pixels and the voltage coefficient corresponding to the brightness mode comprises:

determining the data voltage characterization value of the current display image according to a product of a display grayscale of the display grayscales of the plurality of sub-pixels and the voltage coefficient corresponding to the brightness mode.

7. The method of claim 1, wherein determining the brightness mode of the display panel comprises:

determining the brightness mode of the display panel according to a position of a brightness bar of the display panel, wherein the different brightness modes correspond to different positions of the brightness bar.

8. The method of claim 1, wherein each drive cycle comprises one data write frame and N display holding frames, and each of the N display holding frames has a same duration as the one data write frame, wherein N is greater than or equal to 2; and before inputting, in the display holding frame of the current display image, the holding voltage to the source electrode of the drive transistor in each sub-pixel of the display panel, the method further comprises:

writing, in a data write frame of the current display image, a data voltage corresponding to each sub-pixel to a gate electrode of the drive transistor in the each sub-pixel.

9. A display device, comprising a processor and a memory, wherein the memory is communicatively connected to the at least one processor, the memory stores a computer program that can be executed by the at least one processor, and the computer program is executed by the at least one processor, to enable the at least one processor to execute a method for driving a display panel;

wherein the method comprising:

determining a brightness mode of the display panel, wherein a same display grayscale in different brightness modes corresponds to different data voltages;

determining a data voltage characterization value according to the brightness mode, wherein the data voltage characterization value is used for characterizing a data voltage level of the brightness mode;

determining a holding voltage corresponding to the data voltage characterization value according to the data voltage characterization value; and inputting, in a display holding frame of a current display image, the holding voltage to a source electrode of a drive transistor in each sub-pixel of the display panel.

10. The display device of claim 9, wherein determining the data voltage characterization value according to the brightness mode comprises:

acquiring display grayscales of a plurality of sub-pixels in the current display image; and determining the data voltage characterization value of the current display image according to the display grayscales of the plurality of sub-pixels and a voltage coefficient corresponding to the brightness mode.

11. The display device of claim 10, wherein the display panel comprises a plurality of display sub-regions, at least one pixel unit is provided in each of the plurality of display sub-regions, and each of the at least one pixel unit comprises at least one sub-pixel;

determining the data voltage characterization value of the current display image according to the display grayscales of the plurality of sub-pixels and the voltage coefficient corresponding to the brightness mode comprises:

determining a maximum display grayscale of the at least one sub-pixel in each of the at least one pixel unit in each of the plurality of display sub-regions of the display panel to obtain a maximum display grayscale of each of the at least one pixel unit in each of the plurality of display sub-regions;

calculating an average of maximum display grayscales of all pixel units in each of the plurality of display sub-regions to obtain a first grayscale average of the each of the plurality of display sub-regions; and determining a data voltage characterization value of each of the plurality of display sub-regions according to the first grayscale average of the each of the plurality of display sub-regions and the voltage coefficient corresponding to the brightness mode; and determining the holding voltage according to the data voltage characterization value comprises:

determining a holding voltage of each of the plurality of display sub-regions according to the data voltage characterization value of the each of the plurality of display sub-regions.

12. The display device of claim 11, wherein the display panel comprises a plurality of data lines configured to input the holding voltage; and adjacent sub-pixels along a first direction are electrically connected to a same data line of the plurality of data lines, and the plurality of display sub-regions are arranged along a second direction, wherein the first direction intersects the second direction.

13. The display device of claim 10, wherein the display panel comprises a plurality of pixel units, and each of the plurality of pixel units comprises at least one sub-pixel; and determining the data voltage characterization value of the current display image according to the display grayscales of the plurality of sub-pixels and the voltage coefficient corresponding to the brightness mode comprises:

determining a maximum display grayscale of the at least one sub-pixel in each of the plurality of pixel units to obtain a maximum display grayscale of each of the plurality of pixel units;

calculating an average of maximum display grayscales of the plurality of pixel units of the display panel to obtain a second grayscale average; and determining the data voltage characterization value of the display panel according to the second grayscale average and the voltage coefficient corresponding to the brightness mode.

14. The display device of claim 10, wherein determining the data voltage characterization value of the current display image according to the display grayscales of the plurality of sub-pixels and the voltage coefficient corresponding to the brightness mode comprises:

determining the data voltage characterization value of the current display image according to a product of a display grayscale of the display grayscales of the plurality of sub-pixels and the voltage coefficient corresponding to the brightness mode.

15. The display device of claim 9, wherein determining the brightness mode of the display panel comprises:

determining the brightness mode of the display panel according to a position of a brightness bar of the display panel, wherein the different brightness modes correspond to different positions of the brightness bar.

16. The display device of claim 9, wherein each drive cycle comprises one data write frame and N display holding frames, and each of the N display holding frames has a same duration as the one data write frame, wherein N is greater than or equal to 2; and before inputting, in the display holding frame of the current display image, the holding voltage to the source electrode of the drive transistor in each sub-pixel of the display panel, the method further comprises:

writing, in a data write frame of the current display image, a data voltage corresponding to each sub-pixel to a gate electrode of the drive transistor in the each sub-pixel.

* * * * *